(12) United States Patent
Mirkazemi-Moud et al.

(10) Patent No.: US 7,784,691 B2
(45) Date of Patent: Aug. 31, 2010

(54) SECURITY FUNCTIONALITY FOR MAGNETIC CARD READERS AND POINT OF SALES DEVICES

(75) Inventors: Mehran Mirkazemi-Moud, Rocklin, CA (US); Arnon Aviv, Herzlia (IL)

(73) Assignee: Verifone Inc., San Jose, CA (US)

( * ) Notice: Subject to any disclaimer, the term of this patent is extended or adjusted under 35 U.S.C. 154(b) by 602 days.

(21) Appl. No.: 11/766,457

(22) Filed: Jun. 21, 2007

(65) Prior Publication Data

US 2008/0315989 A1 Dec. 25, 2008

Related U.S. Application Data

(63) Continuation-in-part of application No. 11/636,369, filed on Dec. 8, 2006, now Pat. No. 7,497,378.

(51) Int. Cl.
*G06K 7/08* (2006.01)
(52) U.S. Cl. .................. 235/449; 235/380; 235/439
(58) Field of Classification Search .......... 235/449, 235/380, 439, 493
See application file for complete search history.

(56) References Cited

U.S. PATENT DOCUMENTS

| | | | |
|---|---|---|---|
| 5,861,662 A | 1/1999 | Candelore | |
| 5,998,858 A | 12/1999 | Little et al. | |
| 6,646,565 B1 | 11/2003 | Fu et al. | |
| 6,830,182 B2 | 12/2004 | Izuyama | |
| 6,853,093 B2 | 2/2005 | Cohen et al. | |
| 6,917,299 B2 | 7/2005 | Fu et al. | |
| 7,309,012 B2 | 12/2007 | von Mueller et al. | |
| 2005/0219728 A1* | 10/2005 | Durbin et al. | 360/46 |
| 2005/0234715 A1* | 10/2005 | Ozawa | 704/226 |
| 2006/0049255 A1 | 3/2006 | von Mueller et al. | |

FOREIGN PATENT DOCUMENTS

| | | |
|---|---|---|
| JP | 2002108711 | 4/2002 |
| WO | 2005/086546 | 9/2005 |

* cited by examiner

*Primary Examiner*—Karl D. Frech
(74) *Attorney, Agent, or Firm*—Fish & Richardson P.C.

(57) ABSTRACT

A magnetic card reader including a magnetic head, located in a non-secured region, at least one signal path extending from the magnetic head in the non-secured region to a secured region, signal processing circuitry located within the secured region, an obscuring signal injector located within the secured region and an obscuring signal remover located within the secured region, for receiving a combination of at least one signal output and an obscuring signal and for providing an unobscured signal output, corresponding to the at least one signal output, to the signal processing circuitry.

20 Claims, 10 Drawing Sheets

FIG. 8G ively or additionally, the obscuring signal includes a --

SECURITY FUNCTIONALITY FOR MAGNETIC CARD READERS AND POINT OF SALES DEVICES

CROSS REFERENCE TO RELATED APPLICATION(S)

This application is a continuation-in-part of prior application Ser. No. 11/636,369, filed Dec. 8, 2006.

FIELD OF THE INVENTION

The present invention relates to magnetic card readers generally.

BACKGROUND OF THE INVENTION

The following patent documents are believed to represent the current state of the art:
Japanese Patent JP 2002108711;
U.S. Pat. Nos. 6,830,182; 6,853,093 5,998,858, 5,861,662 and 6,917,299;
Published PCT Application WO 2005/086546; and
U.S. Published Patent Application 2006/0049255.

SUMMARY OF THE INVENTION

The present invention seeks to provide a magnetic card reader having enhanced security.

There is thus provided in accordance with a preferred embodiment of the present invention a magnetic card reader including a magnetic head having at least one signal output, the magnetic head being located in a non-secured region, at least one signal path extending from the magnetic head in the non-secured region to a secured region and carrying the at least one signal output, signal processing circuitry located within the secured region and receiving the at least one signal output along the at least one signal path, an obscuring signal injector located within the secured region and coupled to the at least one signal path at a location within the secured region, the obscuring signal injector being operative to apply an obscuring signal to the at least one signal path, such that the signal that appears on the at least one signal path is a combination of the at least one signal output and the obscuring signal and an obscuring signal remover located within the secured region and coupled to the at least one signal path at a location within the secured region, for receiving the combination of the at least one signal output and the obscuring signal and for providing an unobscured signal output, corresponding to the at least one signal output, to the signal processing circuitry.

There is also provided in accordance with another preferred embodiment of the present invention a point-of-sale device including a housing and a magnetic card reader associated with the housing, the magnetic card reader including a magnetic head having at least one signal output, the magnetic head being located in a non-secured region, at least one signal path extending from the magnetic head in the non-secured region to a secured region and carrying the at least one signal output, signal processing circuitry located within the secured region and receiving the at least one signal output along the at least one signal path, an obscuring signal injector located within the secured region and coupled to the at least one signal path at a location within the secured region, the obscuring signal injector being operative to apply an obscuring signal to the at least one signal path, such that the signal that appears on the at least one signal path is a combination of the at least one signal output and the obscuring signal and an obscuring signal remover located within the secured region and coupled to the at least one signal path at a location within the secured region, for receiving the combination of the at least one signal output and the obscuring signal and for providing an unobscured signal output, corresponding to the at least one signal output, to the signal processing circuitry.

Preferably, the signal processing circuitry includes real time decoding circuitry operative to decode the unobscured signal output generally in real time thereby to produce a digital signal corresponding to the at least one signal output.

Preferably, the obscuring signal injector and the obscuring signal remover are at least partially software implemented.

Preferably, the obscuring signal injector receives the at least one signal output from the magnetic head along the at least one signal path and is operative to apply an obscuring signal which is adapted in accordance with at least one of the frequency and amplitude of the at least one signal output. Alternatively or additionally, the obscuring signal includes a random component.

Preferably, the magnetic card reader also includes an impedance sensor coupled to the at least one signal path at a location within the secured region. Additionally, the magnetic card reader also includes an impedance change indicator and wherein the impedance sensor provides an output indication to the impedance change indicator when a resistance or other impedance is coupled to the at least one signal path in an unauthorized manner.

Preferably, the magnetic head includes a mounting element, at least one information reading sensor having output contacts, the sensor being mounted in the mounting element and a flat cable coupled to the output contacts of the at least one information reading sensor, a portion of the flat cable being arranged in a doubled-over configuration over the output contacts, thereby to provide anti-tampering protection to the output contacts. Additionally, the mounting element defines a peripheral anti-tampering enclosure and wherein the at least one information reading sensor and the portion of the flat cable arranged in a doubled-over configuration are located within the peripheral anti-tampering enclosure.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
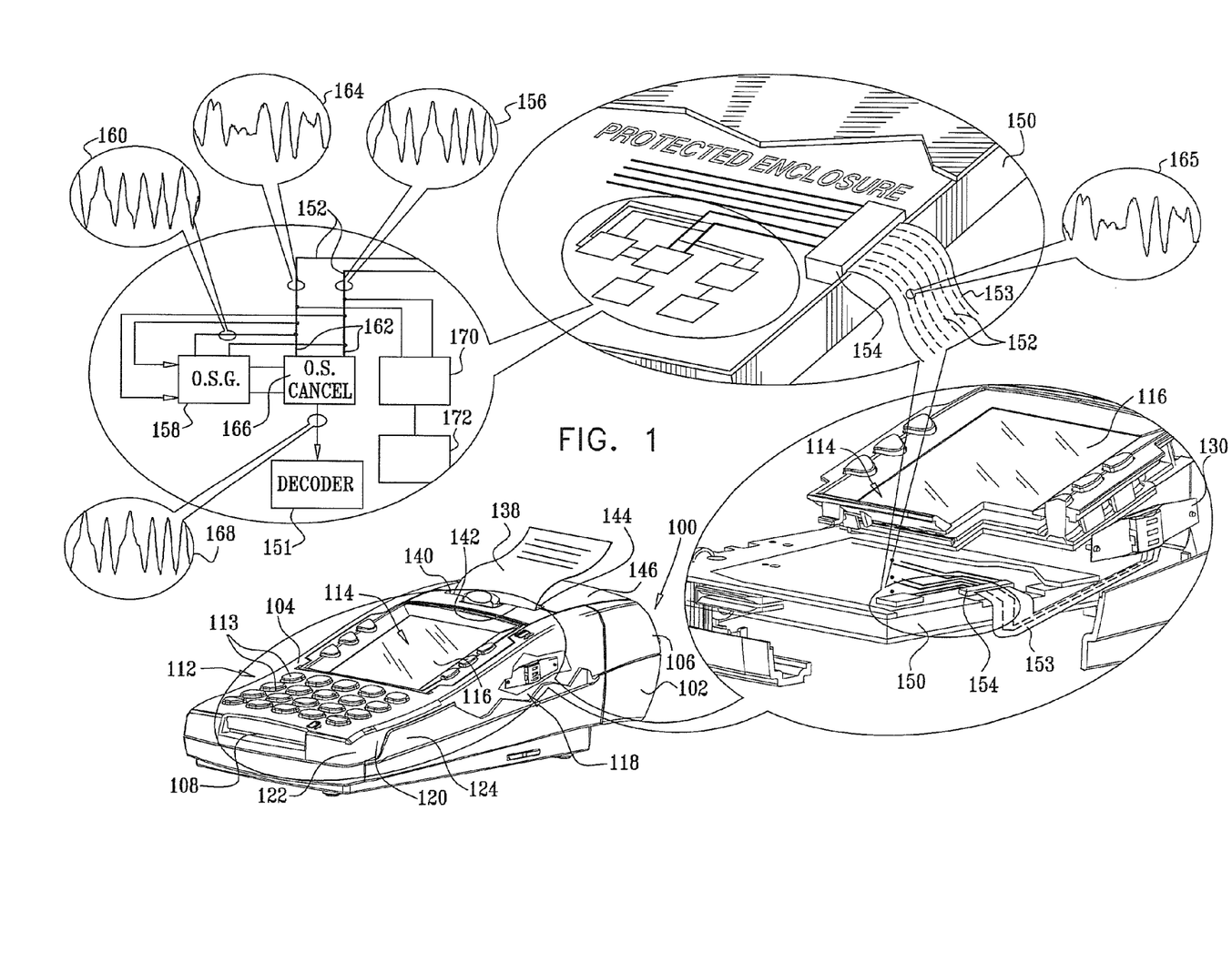
FIG. 1 is a simplified partially schematic, partially block diagram illustration of a point of sale terminal including magnetic card reader functionality incorporating a preferred embodiment of the present invention.

Reference is now made to FIG. 1, which illustrates a point of sale terminal including a card reader constructed and operative in accordance with a preferred embodiment of the present invention. As seen in FIG. 1, the point of sale terminal may be generally similar in structure and function to a conventional point of sale terminal such as a NURIT 8100, commercially available from Verifone, Inc. It is appreciated that the present invention is not limited in its application to a given type or model of point of sale terminal but is applicable to magnetic stripe reading devices useful in any suitable point of sale device. Such a point of sale device may include, for example, a check reader, a card-based payment terminal, an electronic cash register, a PIN pad, an automatic teller machine (ATM), an automated kiosk and an electronic vending machine.

As seen in FIG. 1, the point of sale terminal preferably includes a housing 100 including a base portion 102 and a top portion 104, which are typically snap-fitted together. In the illustrated embodiment, the housing also includes a detachable and reattachable printer housing portion 106. The top portion 104 of housing 100 preferably defines a smart-card insertion slot 108, which communicates with a smart-card reader (not shown) located within the housing. The top portion 104 of the housing 100 also defines a keypad array location 112 wherein an array of keys 113 are located, and a display location 114, where a display, such as an LCD display 116, is located. Additionally, the top portion 104 of housing 100 preferably defines a magnetic card reader assembly 118, which includes a slot 120 having spaced surfaces 122 and 124. A magnetic head assembly 130 is mounted on surface 122, typically on an inside wall of surface 122.

A printer (not shown) is disposed within printer housing portion 106 and cooperates with a roll of paper (not shown), which is supported on a paper roll holder (not shown) located within printer housing portion 106. Printed receipts 138 are output via a printer paper slot 140 defined between an edge 142 of top portion 104 and a corresponding edge 144 of a paper roll cover 146.

Disposed within housing 100 is an anti-tamper protected enclosure 150. Anti-tamper protected enclosure 150 may be constructed of rigid or flexible printed circuit elements having embedded therein electrical conductors coupled to anti-tamper detection circuitry (not shown) located within enclosure 150. Preferred embodiments of suitable anti-tamper protected enclosures are described in applicant/assignee's U.S. Pat. Nos. 6,853,093 and 6,646,565 and 6,917,299. Any other suitable type of anti-tamper protected enclosure 150 may be employed.

It is appreciated that the magnetic head assembly 130 is located outside the anti-tamper protected enclosure 150 and is coupled to decoding circuitry 151 located within the anti-tamper protected enclosure 150, typically by electrical conductors 152, which typically form part of a flexible flat cable 153 which are coupled to a connector 154, preferably located within the anti-tamper protected enclosure 150.

It is a particular feature of the present invention that the output signals of the magnetic head assembly 130, typically shown at enlargement 156, which pass along electrical conductors 152, are obscured by obscuring signals injected onto electrical conductors 152 at locations within the anti-tamper protected enclosure 150 by an obscuring signal injector. Thus unauthorized tapping into the electrical conductors 152 outside of the anti-tamper protected enclosure 150 does not readily enable the output signals of the magnetic head assembly 130 to be read.

The obscuring signals are typically produced by an obscuring signal injector 158 which provides an obscuring signal, such as a signal illustrated in enlargement 160, to electrical conductors 152 at signal injection locations 162 located within the anti-tamper protected enclosure 150. The obscuring signal injector 158 may receive inputs from the conductors 152 to enable the obscuring signal injector 158 to generate an obscuring signal which is best suited for the frequency and amplitude of the output signals from the magnetic head assembly 130. The frequency and amplitude of these output signals vary inter alia as a function of the speed with which a magnetic card is swiped past the magnetic head assembly 130.

The injection of the obscuring signals from the obscuring signal injector 158 causes the signals appearing all along electrical conductors 152, including those portions of conductors 152 outside of the protected enclosure 150, to be the stun of the output signals from the magnetic head assembly 130, shown at enlargement 156, and the obscuring signal, illustrated in enlargement 160. It is noted for clarity that the signal shown at enlargement 156 only appears during swiping of a card at card reader assembly 118 in the absence of the obscuring signal. Similarly, the signal shown at enlargement 160 occurs only when a card is not being swiped at card reader assembly 118 and the obscuring signal is present. The composite signals are shown at enlargements 164 and 165 and occur when a card is being swiped at card reader assembly 118 and the obscuring signal is present. Unauthorized tapping of conductors 152 would not readily yield the output signals from the magnetic head assembly 130, shown at enlargement 156.

The obscuring signals from obscuring signal injector 158 are also preferably supplied to cancellation circuitry 166, also located within the protected enclosure 150, which also receives the composite signals shown in enlargements 164 and 165 and subtracts therefrom the obscuring signals shown at enlargement 160, thus reconstructing the original output signals from the magnetic head assembly 130, as shown at enlargement 168. It is appreciated that the original output signal is only present within the protected enclosure 150.

Additionally, in accordance with a preferred embodiment of the present invention, there may be provided an impedance sensor 170 which is preferably coupled to conductors 152 at a location within the protected enclosure 150. Impedance sensor 170 is operative to sense when a resistance or other impedance is coupled to conductor 152 in an unauthorized manner, in an attempt to tap signals along conductor 152. The impedance sensor 170 preferably provides an output indication to an impedance change indicator 172, which can be used to foil such tapping or provide an alarm indication thereof.

Figure 2:
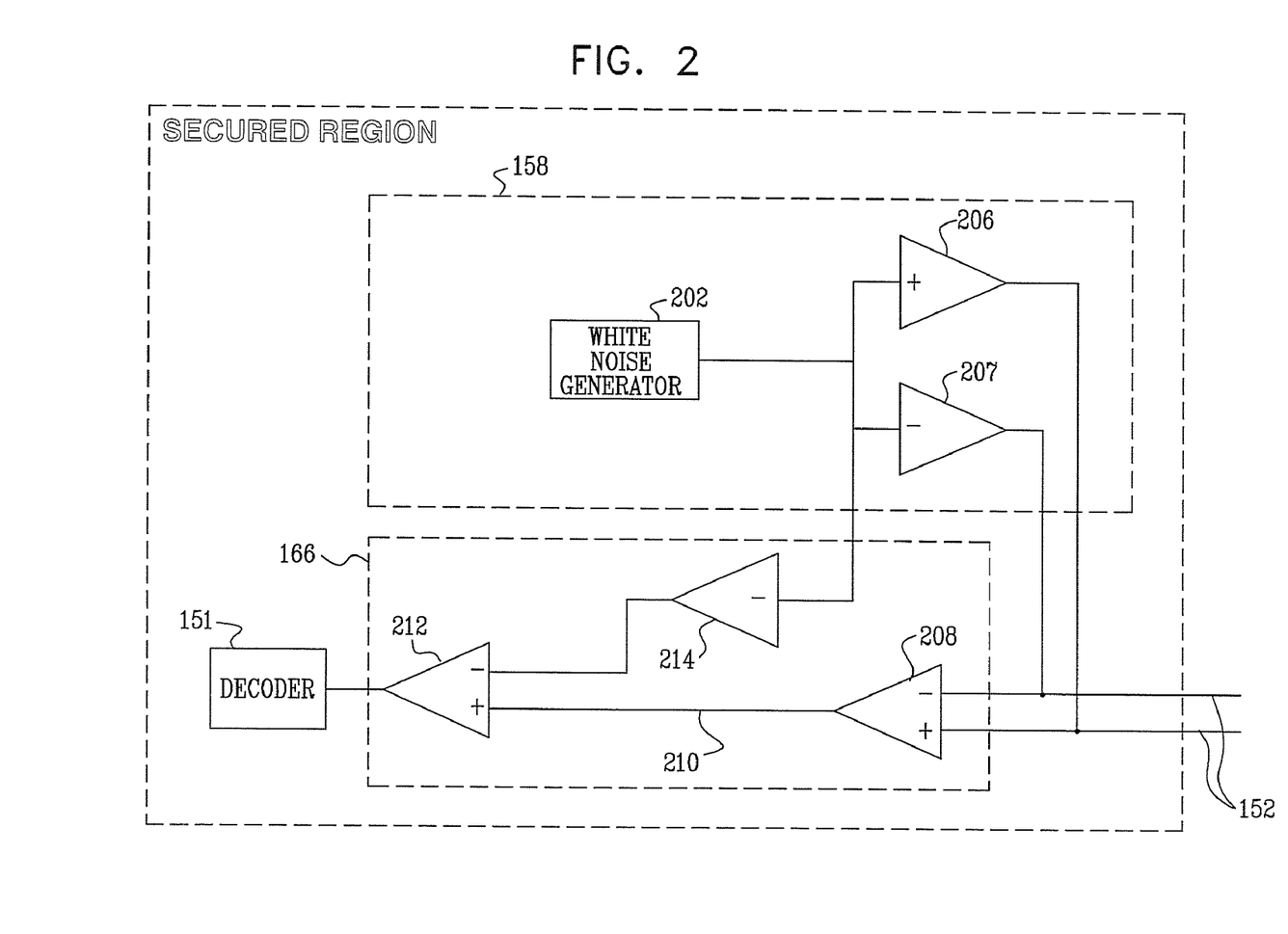
FIG. 2 is a simplified electrical schematic illustration of one embodiment of circuitry useful in the embodiment of FIG. 1.
Figure 6:
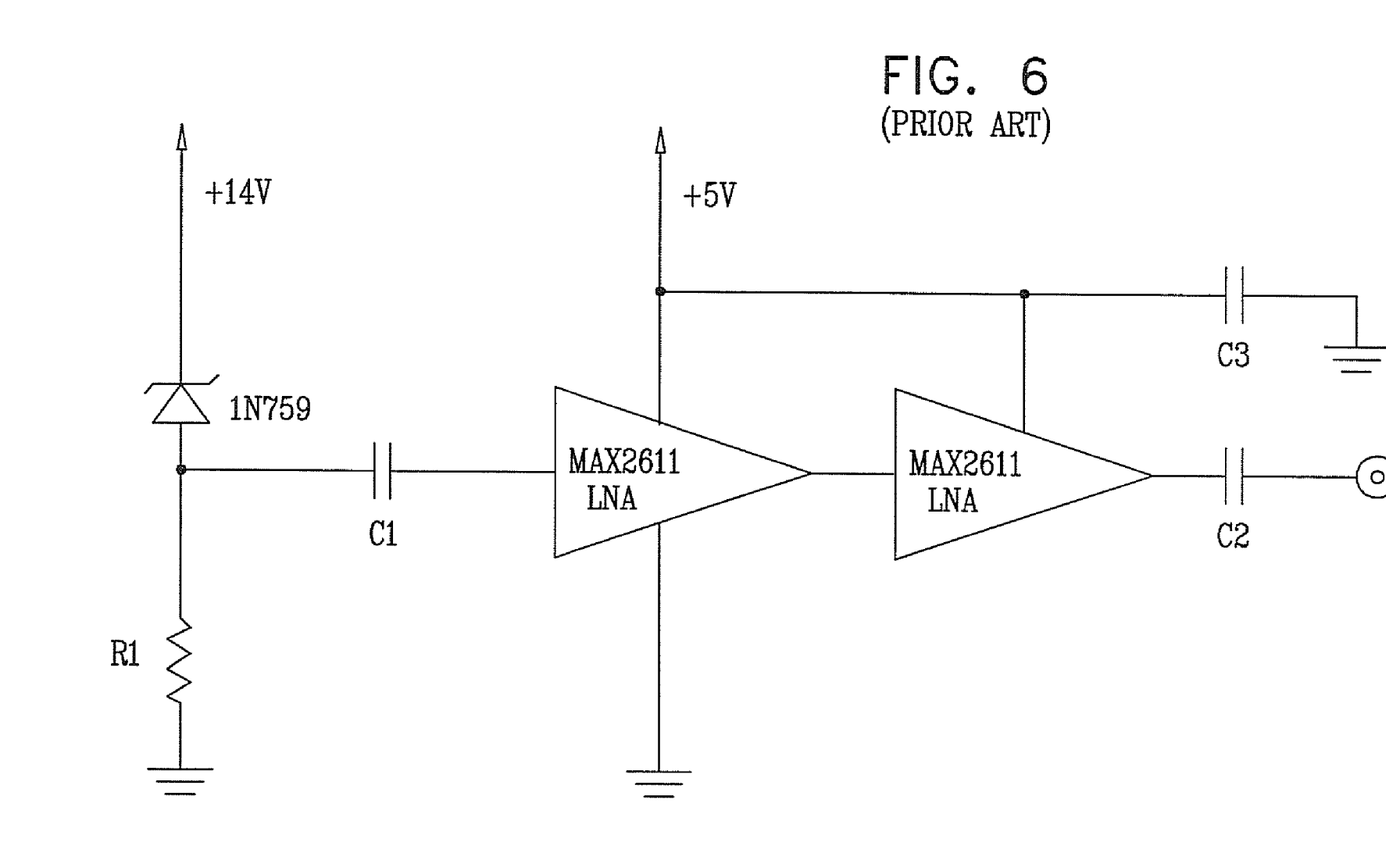
FIG. 6 is a simplified electrical schematic illustration of a white noise generator useful in the embodiments of FIGS. 2 and 4.

Reference is now made to FIG. 2, which illustrates an implementation of the circuitry of FIG. 1. The obscuring signal injector 158 (FIG. 1) is preferably embodied in a conventional white noise generator 202 which outputs to a pair of parallel operational amplifiers 206 and 207, the amplification of operational amplifier 206 being the inverse of the amplification of operational amplifier 207. The white noise generator may be, for example, a circuit which is fully described and illustrated in FIG. 6, which appears in application note 3469 of Dallas Semiconductor dated Feb. 1, 2005. The outputs of respective operational amplifiers 206 and 207 are injected onto conductors 152. Alternatively, the obscuring signal injector 158 may employ pulse width modulation circuitry.

The obscuring signal cancellation circuitry 166 preferably is embodied in an operational amplifier 208 which converts the inputs thereto to a single output signal, indicated by reference numeral 210. Output signal 210 contains the obscuring signals, for example white noise, as well as the output signals, shown at enlargement 156, from the magnetic head assembly 130 (FIG. 1). Output signal 210 is supplied to one input of a differential operational amplifier 212 whose other input receives the output of an operational amplifier 214, whose input is the output of the white noise generator 202. Operational amplifier 214 adjusts the amplitude of the output of white noise generator 202 such that the obscuring signals are cancelled at the output of operational amplifier 212.

Figure 3:
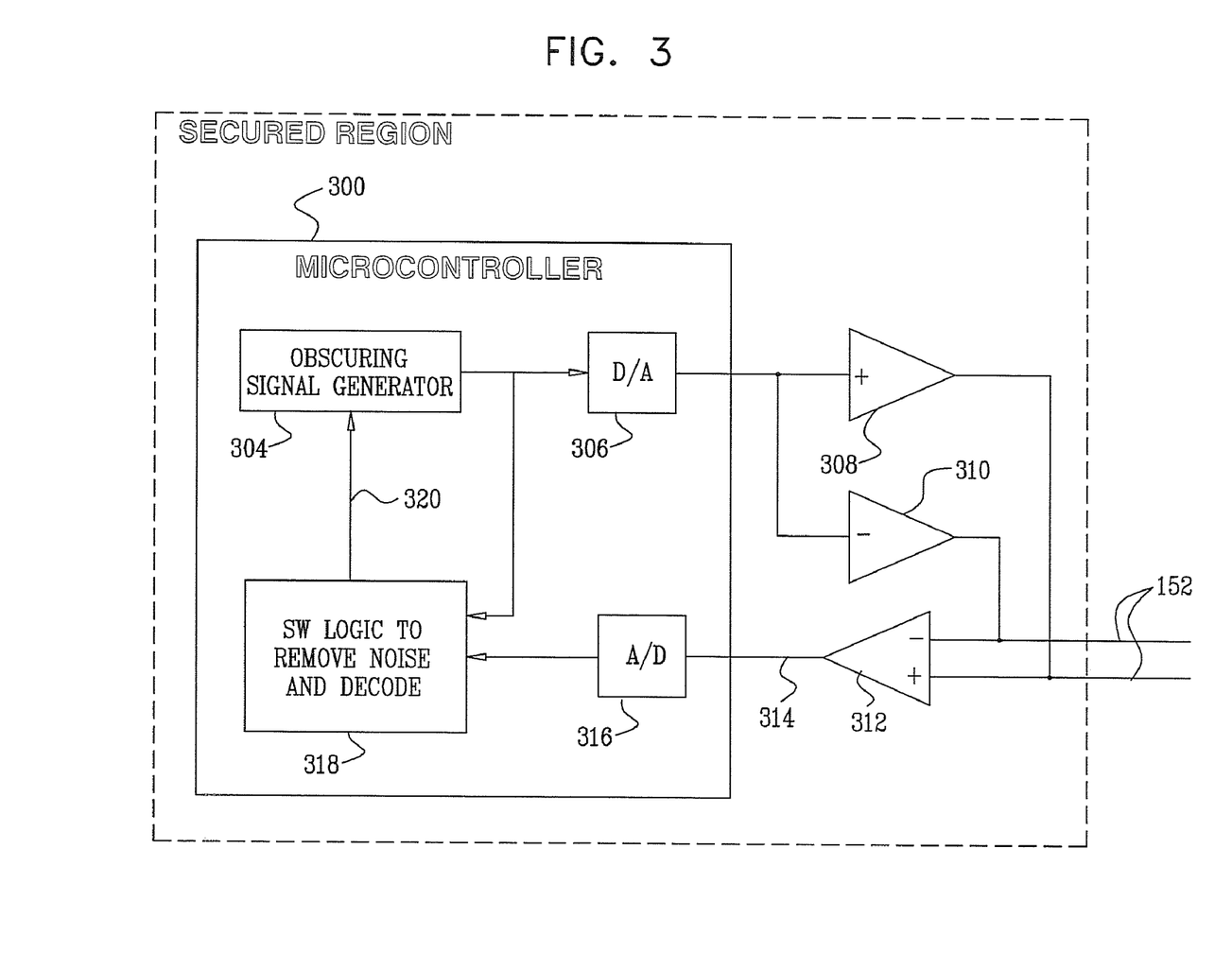
FIG. 3 is a simplified electrical schematic illustration of a preferred embodiment of circuitry useful in the embodiment of FIG. 1.

Reference is now made to FIG. 3, which illustrates a preferred implementation of the circuitry of FIG. 1, employing a microcontroller or other processor 300. The obscuring signal injector 158 (FIG. 1) is preferably embodied in a conventional software-implemented obscuring signal generator 304, which in turn provides an output via digital to analog conversion circuitry 306 to a pair of parallel operational amplifiers 308 and 310, the amplification of operational amplifier 308 being the inverse of the amplification of operational amplifier 310. The outputs of respective operational amplifiers 308 and 310 are injected onto conductors 152.

The obscuring signal cancellation circuitry 166 (FIG. 1) preferably is embodied in an operational amplifier 312 which converts the inputs thereto to a single output signal, indicated by reference numeral 314, which contains the obscuring signals, as well as the output signals shown at enlargement 156 (FIG. 1) from the magnetic head assembly 130. Output signal 314 is supplied via an analog to digital converter 316 to software implemented noise removal and decoding functionality 318 which also receives the output of software-implemented obscuring signal generator 304. Software implemented noise removal and decoding functionality 318 outputs a signal within the secured area which contains information stored on the magnetic stripe of the card that is read by the magnetic head assembly 130. Functionality 318 may also provide a suitable feedback signal, here designated by reference numeral 320 to the obscuring signal generator 304. Impedance sensor 170 (FIG. 1) may also be implemented in processor 300.

It is appreciated that the circuitry of FIG. 2 or of FIG. 3 is preferably separately provided for each of the pairs of conductors 152 corresponding to a track reading portion of the magnetic head assembly 130. Preferably different obscuring signals are provided for each pair of conductors. Alternatively, the circuitry of FIG. 2 or FIG. 3 may be employed for all three pairs of conductors 152.

Figure 4:
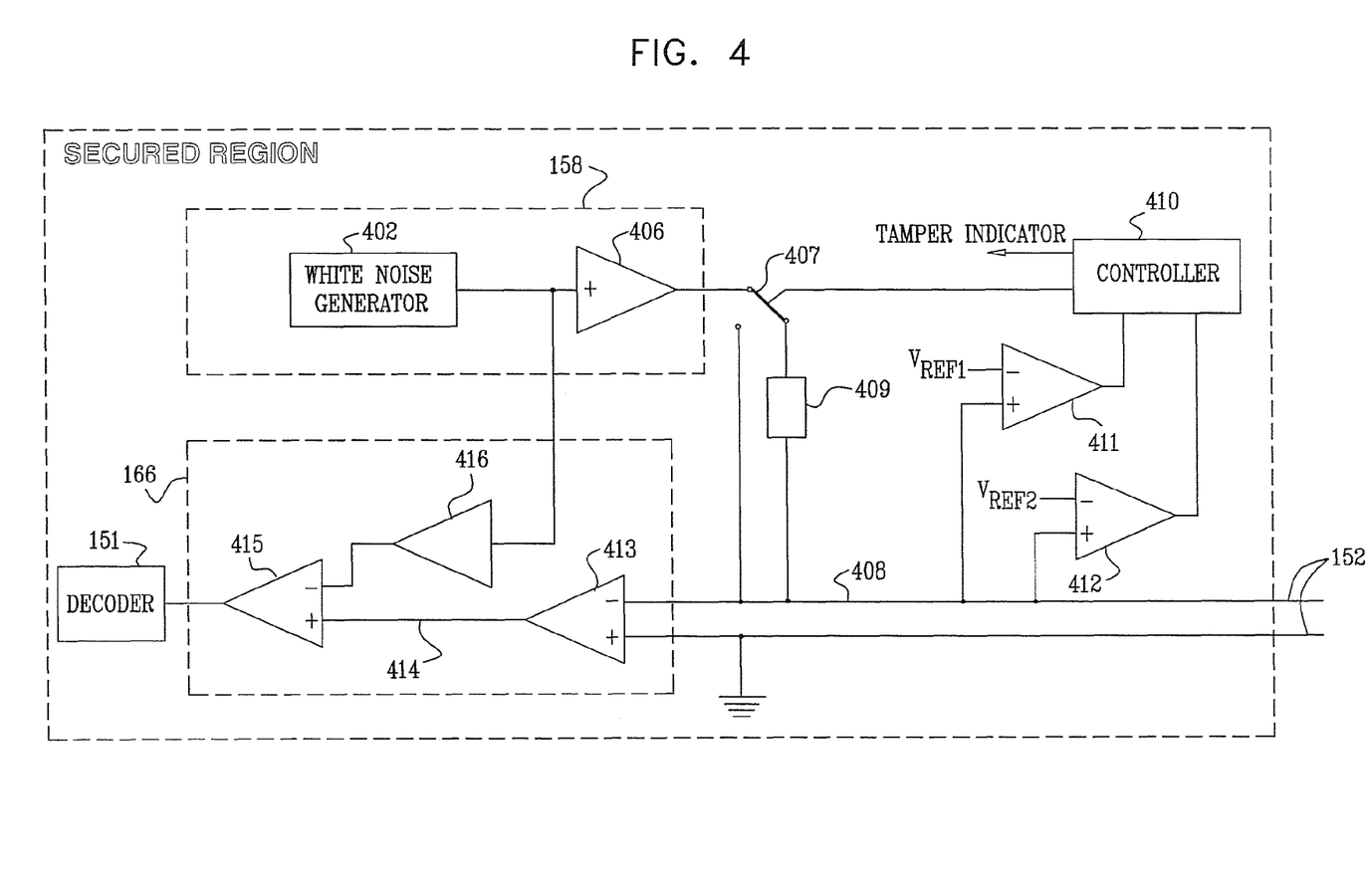
FIG. 4 is a simplified electrical schematic illustration of another embodiment of circuitry useful in the embodiment of FIG. 1.

Reference is now made to FIG. 4, which illustrates another implementation of the circuitry of FIG. 1. The obscuring signal injector 158 (FIG. 1) is preferably embodied in a conventional white noise generator 402 which outputs to an operational amplifier 406. The white noise generator may be, for example, a circuit which is fully described and illustrated in FIG. 6, which appears in application note 3469 of Dallas Semiconductor dated Feb. 1, 2005.

Operational amplifier 406 provides an output via a switch 407 which switch 407, when in a normal work mode, directs the output directly to one of conductors 152 (FIG. 1) here designated by reference numeral 408, the other of which is grounded or maintained at a fixed voltage. When switch 407 is in a tamper detection mode, it directs the output of operational amplifier 406 via a capacitance, inductance or LC circuit 409 to conductor 408.

Switch 407 is preferably controlled by an operational mode controller 410 which forms part of a voltage window comparison circuit that receives voltage window inputs from a pair of comparators 411 and 412, which receive inputs from conductor 408 as well as respective different reference voltage VREF 1 and VREF 2.

The obscuring signal cancellation circuitry 166 (FIG. 1) preferably is embodied in a differential operational amplifier 413, which subtracts the composite signals on two of the conductors 152, one of which is grounded, thus producing an output signal, indicated by reference numeral 414, which contains the obscuring signals, as well as the output signals shown at enlargement 156 (FIG. 1), from the magnetic head assembly 130 (FIG. 1). Output signal 414 is supplied to one input of a differential operational amplifier 415 whose other input receives the output of an operational amplifier 416, whose input is the output of white noise generator 402. Operational amplifier 416 adjusts the amplitude of white noise generator 402 such that the obscuring signals are cancelled at the output of operational amplifier 415.

Impedance sensor 170 (FIG. 1) is preferably implemented in the following manner, utilizing switch 407, controller 410 and comparators 411 and 412. At a time when the magnetic head 130 (FIG. 1) is not providing a card swipe output signal, a determination is made whether the voltage of the signal supplied to controller 410 from comparators 411 and 412 falls within a preset voltage window, indicating that no impedance has been coupled to conductors 152 in an unauthorized manner. If the voltage does not fall within the window, an output from controller 410 provides an output indication of tampering to impedance change indicator 172 (FIG. 1), which can be used to foil such tampering or provide an alarm indication thereof.

Figure 5:
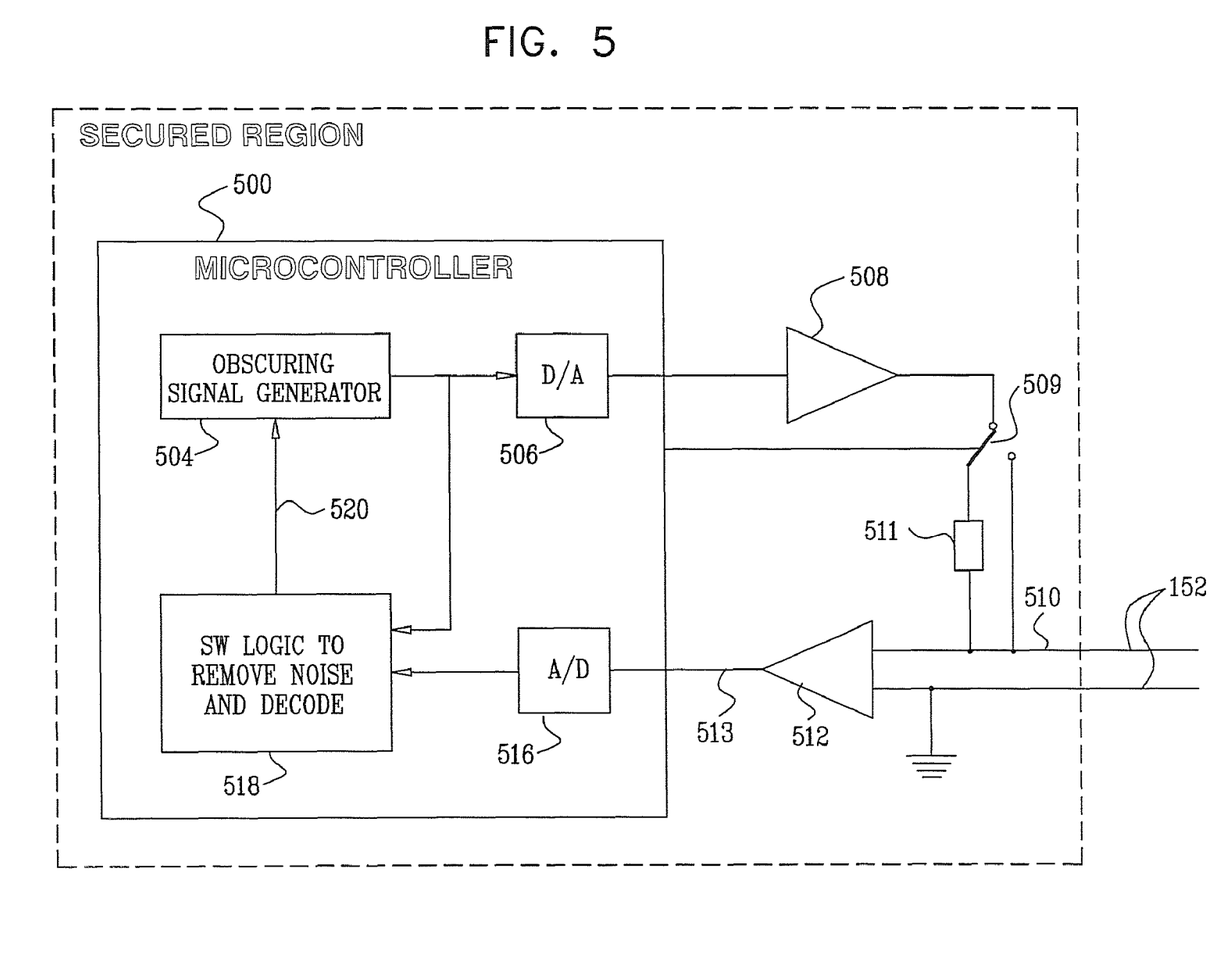
FIG. 5 is a simplified electrical schematic illustration of another preferred embodiment of circuitry useful in the embodiment of FIG. 1.

Reference is now made to FIG. 5, which illustrates another preferred implementation of the circuitry of FIG. 1, employing a microcontroller or other processor 500. The obscuring signal injector 158 (FIG. 1) is preferably embodied in a conventional software-implemented obscuring signal generator 504, which in turn provides an output via digital to analog conversion circuitry 506 to an operational amplifier 508. Operational amplifier 508 provides an output via a switch 509 which switch, when in a normal work mode, directs the output directly to one of conductors 152 (FIG. 1) here designated by reference numeral 510, the other of which is grounded or maintained at a fixed voltage. When switch 509 is in a tamper detection mode, it directs the output of operational amplifier 508 via a capacitance, inductance or LC circuit 511 to conductor 510. Switch 509 is preferably controlled by microcontroller 500.

The obscuring signal cancellation circuitry 166 (FIG. 1) preferably is embodied in a differential operational amplifier 512 which amplifies and converts the signals on two of the conductors 152, one of which is grounded, into a single output signal, indicated by reference numeral 513, which contains the obscuring signals, as well as the output signals shown at enlargement 156 (FIG. 1) from the magnetic head assembly 130 (FIG. 1). Output signal 513 is supplied via analog to digital conversion circuitry 516 to software implemented noise removal and decoding functionality 518 which also receives the output of software-implemented obscuring signal generator 504. Functionality 518 may also provide a suitable feedback signal, here designated by reference numeral 520 to the obscuring signal generator 504. Impedance sensor 170 (FIG. 1) may also be implemented in processor 500, utilizing switch 509.

Impedance sensor 170 (FIG. 1) is preferably implemented in the following manner, utilizing circuitry 511. At a time when the magnetic head 130 (FIG. 1) is not providing a card swipe output signal, a swept frequency signal is provided via circuitry 511 and a determination is made of whether the resulting signal is similar to an acceptable degree to a reference signal preset in the microcontroller. Similarity of the signals indicates that no impedance has been coupled to conductors 152 in an unauthorized manner. Lack of sufficient similarity causes the microcontroller to provide an output indication of tampering to impedance change indicator 172 (FIG. 1), which can be used to foil such tampering or provide an alarm indication thereof. Impedance change indicator 172 may also be embodied in the microcontroller. It is appreciated that this functionality may alternatively be implemented without providing circuitry 511.

It is appreciated that the circuitry of FIG. 4 or of FIG. 5 is preferably separately provided for each of the pairs of conductors 152 corresponding to a track reading portion of the magnetic head assembly 130. Preferably different obscuring signals are provided for each pair of conductors. Alternatively, the circuitry of FIG. 4 or FIG. 5 may be employed for all three pairs of conductors 152, with a phase change or other modification being applied to cause the obscuring signals on each pair of conductors 152 to differ.

Figure 7:
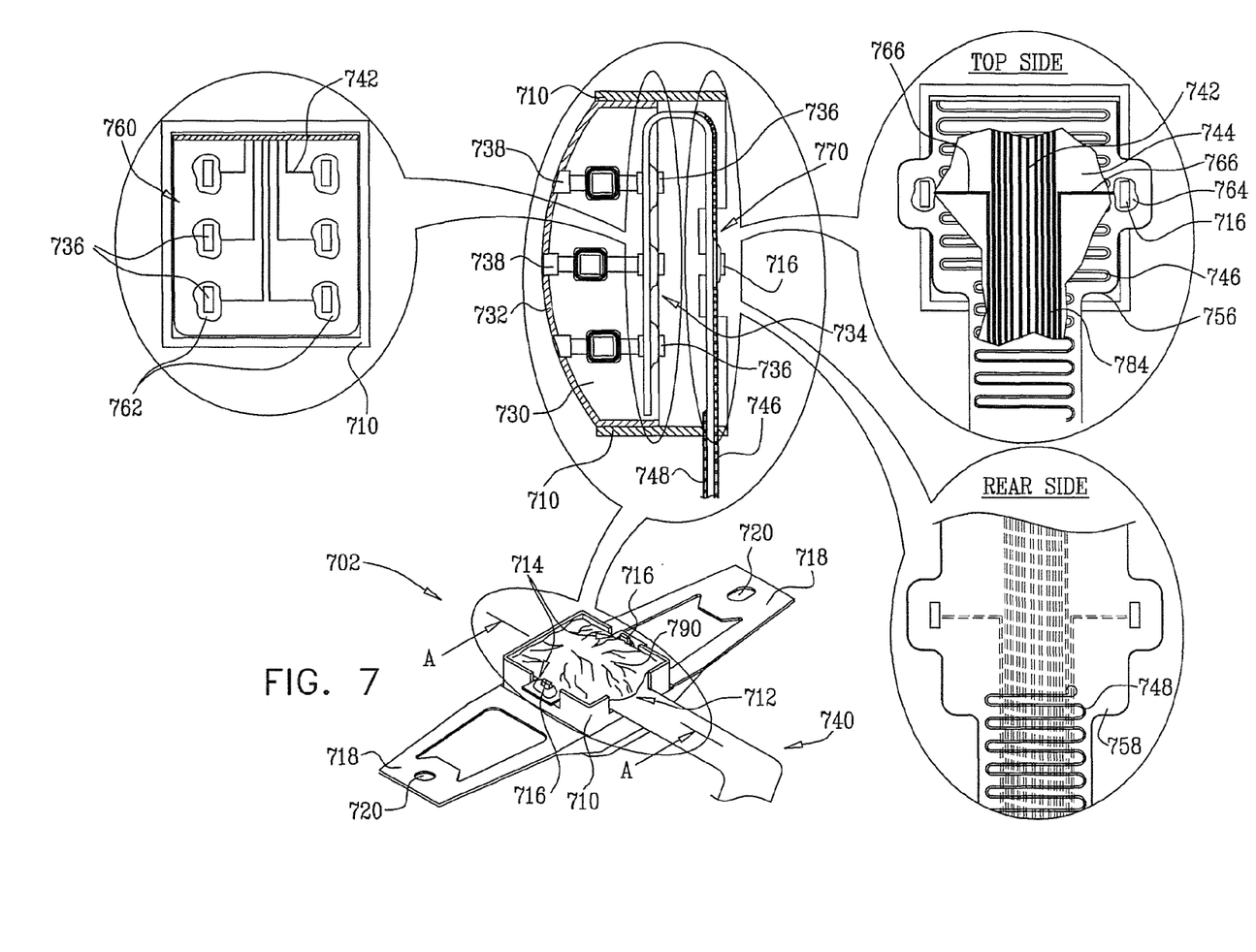
FIG. 7 is a simplified partially pictorial illustration of a magnetic head constructed and operative in accordance with a preferred embodiment of the present invention.

Reference is now made additionally to FIG. 7, which illustrates a magnetic head assembly 130 constructed and operative in accordance with a preferred embodiment of the present invention, which is useful in the magnetic card reader assembly 118. As seen in FIG. 7, the magnetic head assembly 130 preferably comprises a mounting element 702 which is typically mounted onto surface 122 of top portion 104.

Mounting element 702 is preferably formed of metal and preferably defines a peripheral enclosure 710 having an end slot 712 and two bifurcated side slots 714, each defining a ground contact 716. Extending axially sideways from the peripheral enclosure 710 are two winged, generally planar, somewhat flexible mounting portions 718 having mounting apertures 720 formed therein.

An information reading sensor 730, preferably a magnetic stripe reading sensor, such as an Apollo AP-3350B or AP-2250B, commercially available from Apollo (Zhuhai) Electronics Co., Ltd. Apollo Building, Lanpu Industrial Area E, Jiuzhou Road, Zhuhai, China 519070, is mounted within peripheral enclosure 710, such that a reading surface 732 of the sensor 730 extends outside of the enclosure 710 and the back 734 of the sensor, having electrical contacts 736 thereon, lies within the enclosure 710. Reading surface 732 includes one or more sensing regions 738 connected to contacts 736.

In accordance with a preferred embodiment of the present invention, a flat cable and connector assembly 740 is provided having a plurality of conductors 742 disposed in a conductor plane 744 and preferably having a pair of protective wire grids 746 and 748 disposed in respective planes 756 and 758 located on respective opposite sides of the conductor plane 744. The flat cable and connector assembly 740 includes a connector portion 760 preferably including plural plated-through contact apertures 762 for electrical connection to respective ones of contacts 736 and a pair of plated-through ground contact apertures 764 for electrical connection to respective ground contacts 716.

The connector portion 760 is electrically connected to electrical contacts 736, which extend through apertures 762, preferably by soldering, thereby establishing an electrical connection between the sensor 730 and at least some of conductors 742. Others of conductors 742, designated by reference numerals 766, are preferably coupled to ground by being soldered to respective ground contacts 716.

It is a particular feature of the present invention that, as seen in FIG. 7, a portion 770 of the flat cable and connector assembly 740 is arranged in a doubled-over configuration over the output contacts 736, thereby providing enhanced anti-tampering protection thereto. It is a further feature of the present invention that doubled-over portion 770 is located within the peripheral enclosure 710, which functions as an anti-tampering enclosure. Alternatively, the peripheral enclosure 710 may be eliminated and the doubled-over portion 770 is peripherally surrounded by epoxy, thus defining an alternative peripheral enclosure.

In accordance with a preferred embodiment of the present invention, as seen in FIG. 7, protective wire grid 746 extends over doubled-over portion 770. Grids 746 may be coupled to a magnetic head assembly tamper detection and disabling circuit 780. Additionally or alternatively one or more of conductors 742, here designated by reference numeral 784, which are not connected to electrical contacts 736 or ground contacts 716, are also coupled to tamper detection and disabling circuit 780. Circuit 780 is operative to erase encryption keys or other sensitive data upon sensed tampering with grid 746 and/or conductors 784.

Additionally, in accordance with a preferred embodiment of the present invention, protective wire grid 748 extends outwardly from doubled-over portion 770 and is coupled to tamper detection and disabling circuitry 780, preferably located within a protected region 782, of the type described and claimed in assignee's U.S. Pat. No. 6,853,093. Together with grid 746, grid 748 provides anti-tamper protection to the remainder of the flat cable and connector assembly 740. Preferably a layer 790 of epoxy is provided over doubled-over portion 770 within the enclosure 710, thereby providing a mechanically sealed, tamper-protected assembly.

Various types of suitable tamper detection and disabling circuits 780 are described in the following patent publications, the disclosures of which are hereby incorporated by reference: U.S. Pat. Nos. 5,998,858; 5,861,662 and 6,917,299.

Figure 8A:
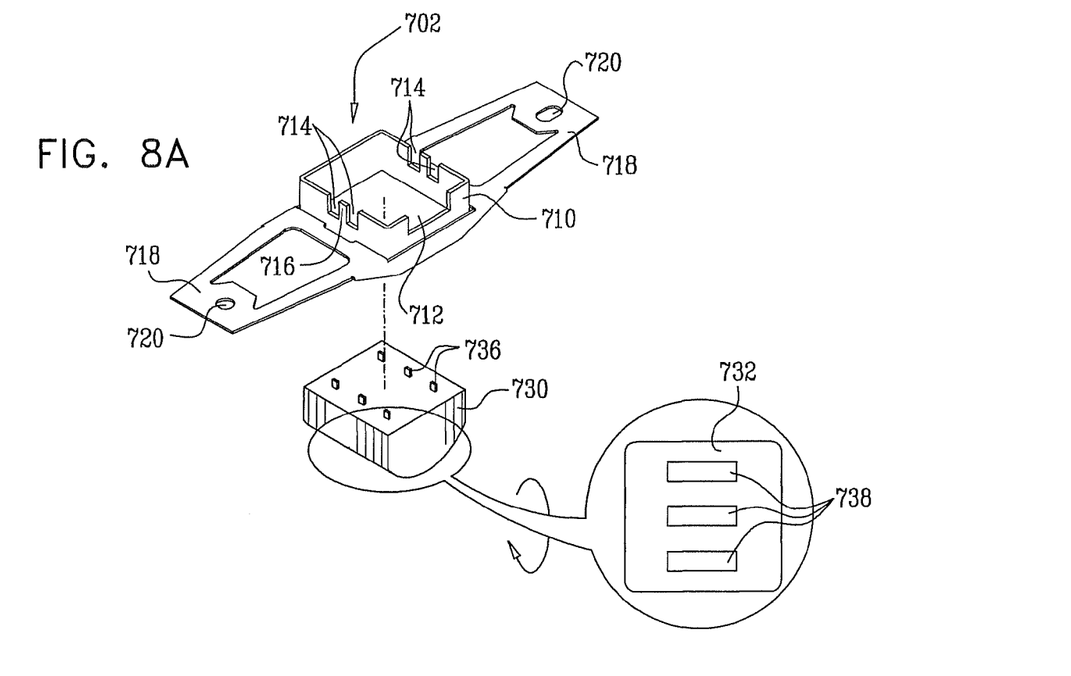
FIGS. 8A, 8B, 8C, 8D, 8E, 8F & 8G are simplified illustrations of steps in a preferred method of manufacture of the magnetic head of FIGS. 1 & 7.
Figure 8B:
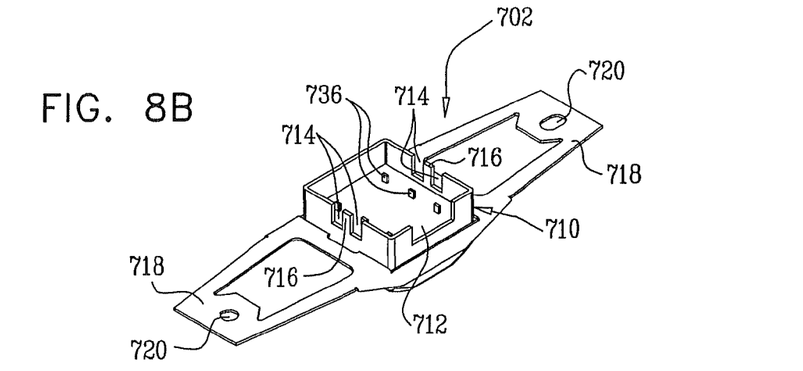
Figure 8C:
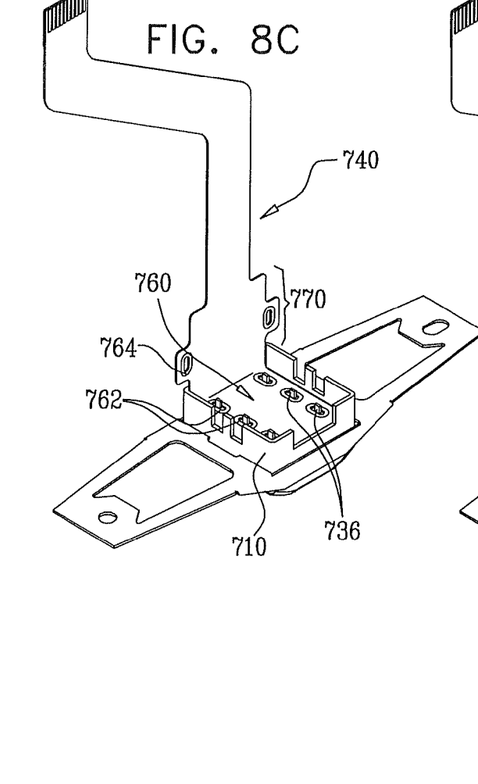
Figure 8D:
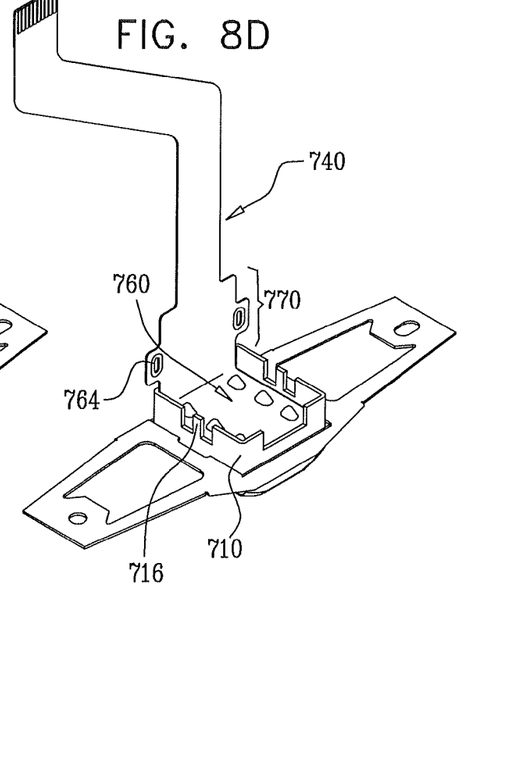

Reference is now made to FIGS. 8A-8G, which illustrate the manufacture of the magnetic head of FIGS. 1 & 7. FIGS. 8A and 8B show enclosure 710 associated with the mounting element 702. Preferably enclosure 710 is integrally formed with the mounting element 702. Alternatively it may be a separate piece which is joined to the mounting element 702. As a further alternative, it may be provided as part of sensor 730 in a customized version thereof. FIG. 8C illustrates connector portion 760 being mounted within enclosure 710 with apertures 762 engaging contacts 736. FIG. 8D shows the contacts 736 being soldered to the apertures 762.

Figure 8E:
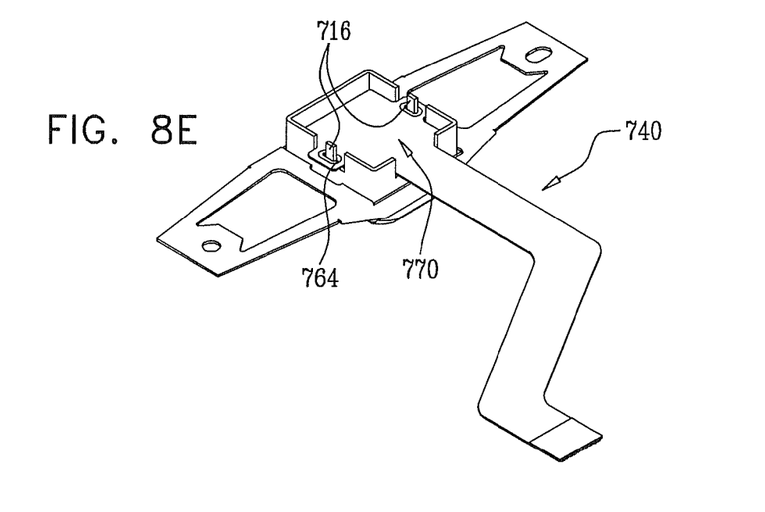
Figure 8F:
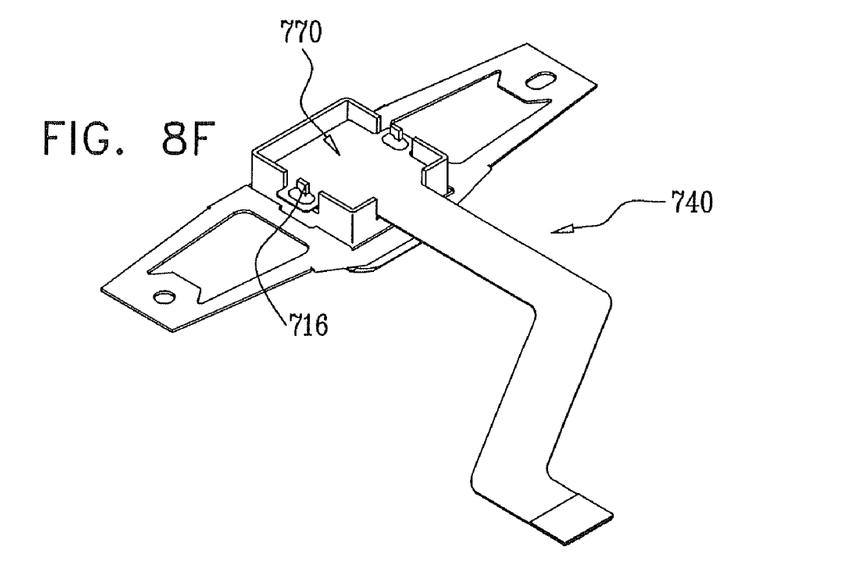
Figure 8G:
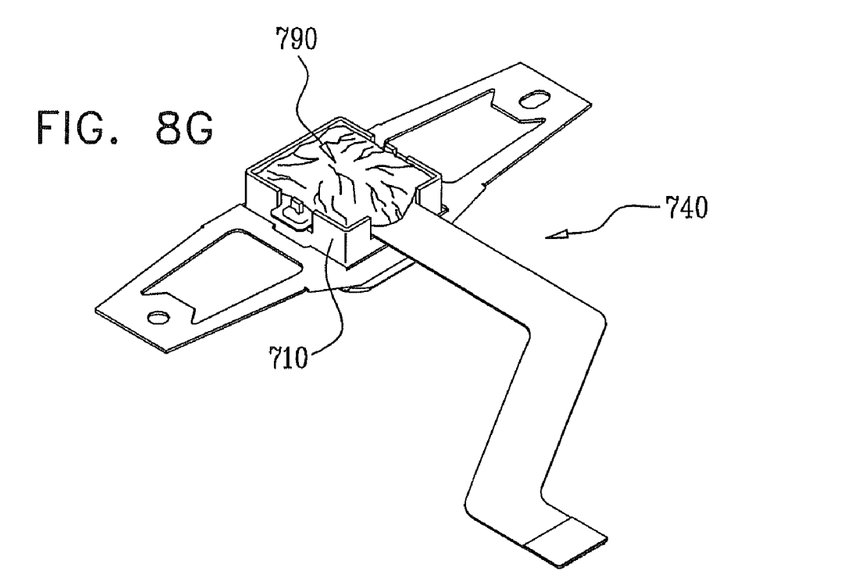

FIG. 8E shows doubled over portion 770 with apertures 764 engaging ground contacts 716. FIG. 8F shows soldering of ground contacts 716 to apertures 764. FIG. 8G shows an epoxy layer 790 formed over doubled-over portion 770 and filling enclosure 710.

It will be appreciated by persons skilled in the art that the present invention is not limited by what has been particularly shown and described hereinabove. Rather the scope of the present invention includes both combinations and sub-combinations of various feature of the invention and modifications thereof which may occur to persons skilled in the art upon reading the foregoing description and which are not in the prior art.

The invention claimed is:

1. A magnetic card reader comprising:
   a protected enclosure;
   a magnetic head having at least one signal output, said magnetic head being located outside said protected enclosure;
   at least one signal path extending from said magnetic head outside said protected enclosure to a location inside of said protected enclosure and carrying said at least one signal output;
   signal processing circuitry located inside of said protected enclosure and receiving said at least one signal output along said at least one signal path; and
   anti-tapping functionality comprising:
      an obscuring signal injector located inside of said protected enclosure and coupled to said at least one signal path at said location within said protected enclosure, said obscuring signal injector being operative to apply an obscuring signal to said at least one signal path, such that the signal that appears on said at least one signal path is a combination of said at least one signal output and said obscuring signal; and
      an obscuring signal remover located within said protected enclosure and coupled to said at least one signal path at said location within said protected enclosure, for receiving said combination of said at least one signal output and said obscuring signal and for providing an unobscured signal output, corresponding to said at least one signal output, to said signal processing circuitry.

2. A magnetic card reader according to claim 1 and wherein said signal processing circuitry comprises real time decoding circuitry operative to decode said unobscured signal output generally in real time thereby to produce a digital signal corresponding to said at least one signal output.

3. A magnetic card reader according to claim 1 and wherein said obscuring signal injector and said obscuring signal remover are at least partially software implemented.

4. A magnetic card reader according to claim 1 and wherein said obscuring signal injector receives said at least one signal output from said magnetic head along said at least one signal path and is operative to apply said obscuring signal which is adapted in accordance with at least one of the frequency and amplitude of said at least one signal output.

5. A magnetic card reader according to claim 1 and wherein said obscuring signal includes a random component.

6. A magnetic card reader according to claim 1 and also comprising an impedance sensor coupled to said at least one signal path at said location inside of said protected enclosure.

7. A magnetic card reader according to claim 6 and also comprising an impedance change indicator and wherein said impedance sensor provides an output indication to said impedance change indicator when a resistance or other impedance is coupled to said at least one signal path in an unauthorized manner.

8. A magnetic card reader according to claim 1 and wherein said magnetic head includes:
   a mounting element;
   at least one information reading sensor having output contacts, said sensor being mounted in said mounting element; and
   a flat cable coupled to said output contacts of said at least one information reading sensor, a portion of said flat cable being arranged in a doubled-over configuration over said output contacts, thereby to provide anti-tampering protection to said output contacts.

9. A magnetic card reader according to claim 8 and wherein said mounting element defines a peripheral anti-tampering enclosure and wherein said at least one information reading sensor and said portion of said flat cable arranged in a doubled-over configuration are located within said peripheral anti-tampering enclosure.

10. A magnetic card reader according to claim 1 and wherein said anti-tapping functionality is operative to reconstruct original output signals from said magnetic head.

11. A point-of-sale device comprising:
   a housing;
   a protected enclosure located within said housing; and
   a magnetic card reader associated with the housing, said magnetic card reader comprising:
      a magnetic head having at least one signal output, said magnetic head being located outside said protected enclosure;
      at least one signal path extending from said magnetic head outside said protected enclosure to a location inside of said protected enclosure and carrying said at least one signal output;
      signal processing circuitry located inside of said protected enclosure and receiving said at least one signal output along said at least one signal path; and
      anti-tapping functionality comprising:
         an obscuring signal injector located inside of said protected enclosure and coupled to said at least one signal path at said location within said protected enclosure, said obscuring signal injector being operative to apply an obscuring signal to said at least one signal path, such that the signal that appears on said at least one signal path is a combination of said at least one signal output and said obscuring signal; and
         an obscuring signal remover located within said protected enclosure and coupled to said at least one signal path at said location within said protected enclosure, for receiving said combination of said at least one signal output and said obscuring signal and for providing an unobscured signal output, corresponding to said at least one signal output, to said signal processing circuitry.

12. A point-of-sale device according to claim 11 and wherein said signal processing circuitry comprises real time decoding circuitry operative to decode said unobscured signal output generally in real time thereby to produce a digital signal corresponding to said at least one signal output.

13. A point-of-sale device according to claim 11 and wherein said obscuring signal injector and said obscuring signal remover are at least partially software implemented.

14. A point-of-sale device according to claim 11 and wherein said obscuring signal injector receives said at least one signal output from said magnetic head along said at least one signal path and is operative to apply said obscuring signal which is adapted in accordance with at least one of the frequency and amplitude of said at least one signal output.

15. A point-of-sale device according to claim 11 and wherein said obscuring signal includes a random component.

16. A point-of-sale device according to claim 11 and also comprising an impedance sensor coupled to said at least one signal path at said location inside of said protected enclosure.

17. A point-of-sale device according to claim 16 and also comprising an impedance change indicator and wherein said impedance sensor provides an output indication to said impedance change indicator when a resistance or other impedance is coupled to said at least one signal path in an unauthorized manner.

18. A point-of-sale device according to claim 11 and wherein said anti-tapping functionality is operative to reconstruct original output signals from said magnetic head.

19. A point-of-sale device according to claim 11 and wherein said magnetic head includes:
- a mounting element;
- at least one information reading sensor having output contacts, said sensor being mounted in said mounting element; and
- a flat cable coupled to said output contacts of said at least one information reading sensor, a portion of said flat cable being arranged in a doubled-over configuration over said output contacts, thereby to provide anti-tampering protection to said output contacts.

20. A point-of-sale device according to claim 19 and wherein said mounting element defines a peripheral anti-tampering enclosure and wherein said at least one information reading sensor and said portion of said flat cable arranged in a doubled-over configuration are located within said peripheral anti-tampering enclosure.

* * * * *